United States Patent [19]

Yohner

[11] Patent Number: 4,541,612

[45] Date of Patent: Sep. 17, 1985

[54] ROTATABLE SHAFT ASSEMBLY

[75] Inventor: Paul A. Yohner, Houston, Tex.

[73] Assignee: Keystone International, Inc., Houston, Tex.

[21] Appl. No.: 596,283

[22] Filed: Apr. 3, 1984

[51] Int. Cl.[4] .............................................. F16K 1/22
[52] U.S. Cl. ................................... 251/308; 251/214; 137/315; 403/326; 403/377
[58] Field of Search ............... 251/305, 306, 307, 308, 251/309, 312, 315, 214; 403/326, 377

[56] References Cited

U.S. PATENT DOCUMENTS 3,857,545 12/1974 Santi .................................. 251/308
4,270,730 6/1981 Hinrichs ............................. 251/308

Primary Examiner—Martin P. Schwadron
Assistant Examiner—James R. Shay
Attorney, Agent, or Firm—Browning, Bushman, Zamecki & Anderson

[57] ABSTRACT

A rotatable shaft assembly comprising a body with a bore having a first end and a second end and an annular abutment formed intermediate the first and second ends of the bore and extending radially inwardly into the bore, a shaft or stem rotatably received in the bore, said shaft having a reduced diameter portion forming an annular shoulder which faces the second end of the bore, a retaining collar disposed in the bore adjacent the abutment, the retaining collar including an annular band and a plurality of resiliently, radially deflectable fingers depending radially inwardly from said band, each of the fingers forming a strut portion terminating in a free end which engages the shoulder on the shaft upon movement of shaft toward the second end of the bore and a stop member disposed in the bore for stopping movement of the retaining collar toward the second end of the bore.

9 Claims, 6 Drawing Figures

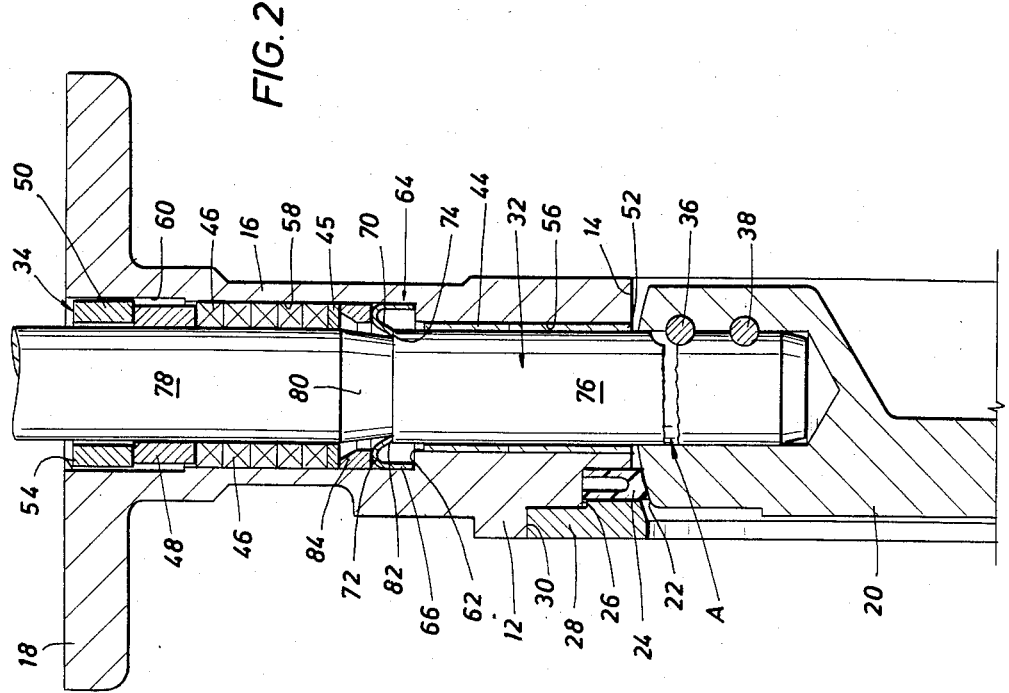
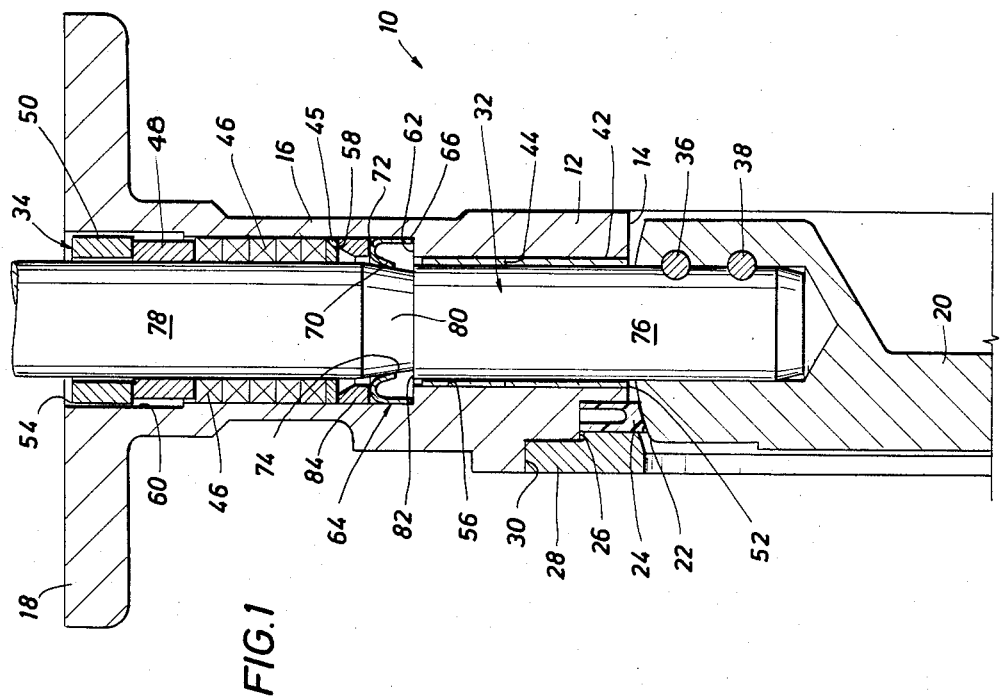

ROTATABLE SHAFT ASSEMBLY

BACKGROUND OF THE INVENTION

The present invention relates to a rotatable shaft assembly and, more specifically, to a shaft assembly for use in rotatable valve assemblies such as butterfly valves.

There are numerous apparatuses which employ rotatable shaft assemblies in which provision must be made to prevent blowout of the shaft from the assembly. Such blowout can occur, for example, if the shaft is in an assembly which is subject to high pressures which can act on the shaft to expel it from the assembly. In particular, in the case of rotatable valve assemblies such as ball valves, butterfly valves and the like, it is often times necessary that the shaft or shafts which are attached to the rotatable valve element, e.g. ball, disk, etc., be provided with a means to prevent the shaft from being blown out of the valve body in the event the shaft shears or if the shaft otherwise is freed from the rotatable valve element such as by failure of the attachment means used to secure the shaft to the valve element. Prior art valve assemblies having blowout proof stems or shafts generally suffer from the disadvantage that the shaft is difficult to remove from the assembly should it be necessary to disassemble the valve or to replace the shaft should it fail.

SUMMARY OF THE INVENTION

It is therefore an object of the present invention to provide a rotatable shaft assembly in which the shaft can be prevented from unwanted ejection from the assembly.

Another object of the present invention is to provide an improved rotatable shaft assembly for use with valves having pivotal valve elements such as ball valves, butterfly valves and the like.

Yet another object of the present invention is to provide a rotatable shaft assembly for use with butterfly valves in which the shaft is rendered blowout proof.

The above and other objects of the present invention will become apparent from the drawings, the description given herein and the appended claims.

The rotatable shaft assembly of the present invention includes a body having a bore therein, the bore having a first end and a second end, the body being provided with an annular abutment which is formed intermediate the first and second ends of the bore and which projects radially inward into the bore. Rotatably received in the bore is a shaft, the shaft having means providing an annular, generally axially facing shoulder intermediate the ends of the shaft, the shoulder having at least one surface facing the second end of the bore. A retaining collar designed to prevent blowout of the shaft from the body is disposed in the bore adjacent the abutment. The retaining collar includes an annular band and a plurality of resilient fingers attached to the band and depending radially inwardly therefrom. Each of the fingers has a portion which forms a strut terminating in a free end. The free end of the strut lies closely adjacent the shaft and is therefore engageable with the shoulder on the shaft upon movement of the shaft toward the second end of the bore. When the free end of the strut engages the shoulder, the strut is placed substantially in compressive loading along its length thereby limiting any further movement of the shaft out of the body. There are also stop means, preferably in the form of an annular member press fitted in the bore for stopping any movement of the retaining collar toward the second end out of the body. The rotatable shaft assembly finds special utility with valves having pivotal valve elements such as ball valves, butterfly valves and the like.

BRIEF DESCRIPTION OF THE DRAWINGS

The invention may be more fully understood by reference to the following description of a preferred embodiment in conjunction with the following drawings wherein:

FIG. 1 is a fragmentary, vertical view, partly in section, of a butterfly valve showing the rotatable valve assembly of the present invention.

FIG. 2 is a view similar to FIG. 1 showing the assembly of FIG. 1 with the shaft sheared.

DESCRIPTION OF THE PREFERRED EMBODIMENTS

Figure 3:
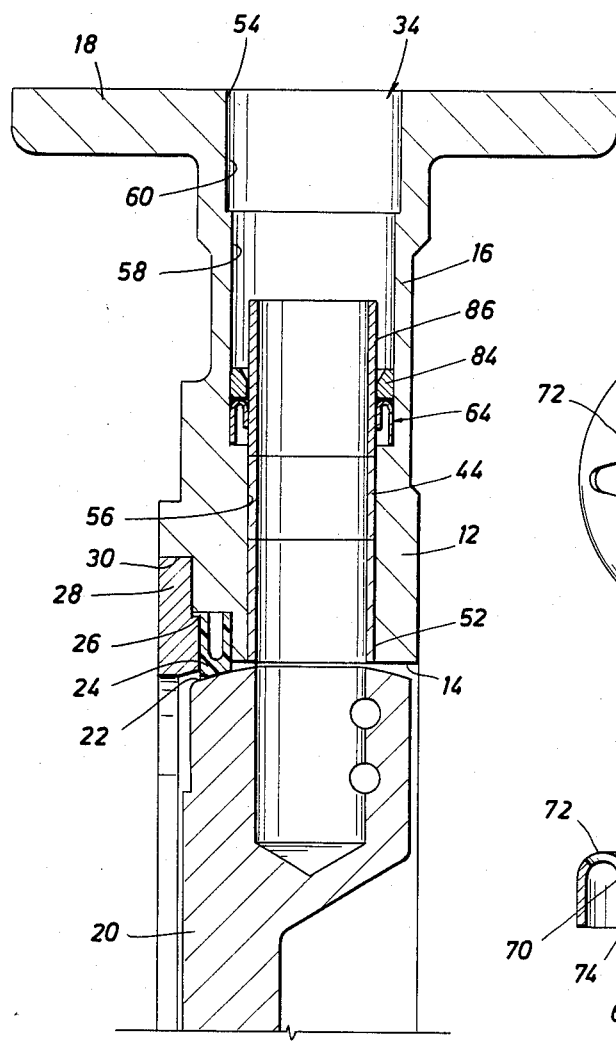
FIG. 3 is a view similar to FIG. 1 showing the shaft removed from the valve assembly.

While the invention will be described with particular reference to a butterfly or disk valve, it is to be understood that the present invention is not so limited. The rotatable shaft assembly of the present invention may be employed in any apparatus employing a rotatable shaft journaled or otherwise rotatably mounted in a body or housing and in which it is desired to prevent the shaft from being accidentally expelled or blown out of the assembly. It will be recognized that in addition to butterfly valves, the rotatable shaft assembly of the present invention is adaptable to any rotatable valve assembly such as, for example, a ball valve, a plug valve, etc. wherein there is a necessity to prevent the shaft which is attached to the valve closure element from being expelled or blown out if the shaft fails and the valve is subjected to high line pressure. The rotatable shaft assembly of the present invention is particularly applicable to the valve assembly shown in U.S. patent application Ser. No. 06/344,501 filed Feb. 2, 1982, the disclosure of which is herein incorporated by reference for all purposes.

Referring first to FIG. 1, there is shown a portion of a butterfly valve assembly 10 having a body 12 with a fluid flow passage 14 therethrough. Extending outwardly from valve body 12 is a cylindrical neck 16 integrally formed with and forming part of body 12. A flange 18 on neck 16 provides a means for securing an actuator (not shown) to the valve 10.

Pivotally supported in the fluid flow passage 14 is a fluid control disk 20 having a peripheral sealing surface 22 which coacts with a seal member 24 to effect sealing between the disk 22 and the body 12 around the periphery of the fluid flow passage 14. Seat 24 is positioned in a counterbore 26 in one face of body 12 and is held in body 12 by an annular retainer plate 28 received in the second counterbore 30 of body 12.

Disk 20 is supported in fluid flow passage 14 by means of a first stem or shaft 32 positioned in a bore 34 of neck 16 and a second shaft (not shown) positioned in a bore diametrically opposite to bore 34 in a boss (not shown) of valve 10. Shaft 32 is fixed to disk 20 by means of pins 36 and 38 and is rotatably journaled in bore 34 by means of bushings 42 and 44. Fluids are prevented from escaping from valve 10 through bore 34 by means of a packing assembly comprising of packing ring 45 and packings 46 which are held in position by means of a gland ring 48 and a packing gland 50.

Figure 4:
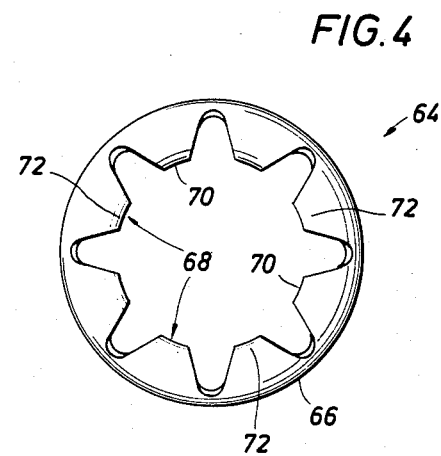
FIG. 4 is a planar view showing one side of the retaining collar used in the rotatable shaft assembly of the present invention.
Figure 5:
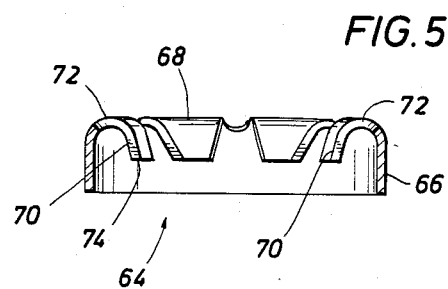
FIG. 5 is an elevational view, partly in section, of the retaining collar shown in FIG. 4.
Figure 6:
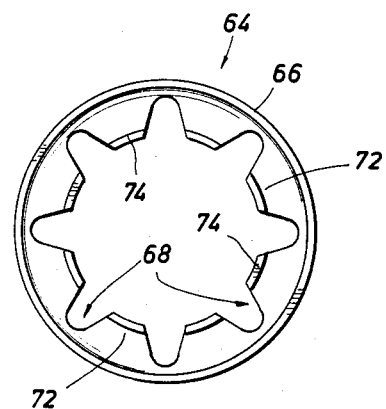
FIG. 6 is a planar view showing the other side of the retaining collar used in the rotatable shaft assembly of the present invention.

Bore 34, which includes a first end 52 and a second end 54, is comprised of a smaller first diameter portion 56, an intermediate second diameter portion 58 and a larger third diameter portion 60. In effect, portions 58 and 60 form counterbores in bore 34. An annular abutment 62 is formed at the intersection of smaller diameter portion 56 and intermediate diameter portion 58, abutment 62 being formed internally of body 12 intermediate the first and second ends 52, 58 of bore 34 and projecting radially inwardly into bore 34. A retaining collar, shown generally as 64, is received in intermediate diameter portion 58 of bore 34 adjacent abutment 62. With reference to FIGS. 4, 5 and 6, it can be seen that retaining collar 64 includes an annular band 66 and a plurality of circumferentially disposed fingers 68 attached to band 66 and depending from band 66 radially inward. Fingers 68, as best seen with reference to FIG. 5, include strut portions 70 connected to band 66 by web portions 72. Strut portion 70 has a free end 74. As can be seen, strut portion 70 extends from generally radially extending web 72 in a generally axial direction with respect to band 66. Fingers 68 possess sufficient resiliency whereby they can be forced radially outwardly toward band 66.

Referring now again to FIG. 1, shaft 32 is seen to include a first end portion 76 and a second end portion 78, portions 76 and 78 having substantially the same diameter. Intermediate end portions 76 and 78 is a reduced diameter portion 80 which is generally frustoconical in configuration, the smaller diameter portion of reduced diameter portion 80 terminating in first end portion 76, the larger diameter portion of reduced portion 80 terminating in second end portion 78. Reduced diameter portion 80 together with first end portion 76 define an annular shoulder 82 having a generally axially facing surface which faces end 58 of bore 34. As can be seen, with band 66 resting on abutment surface 62 formed in body 12, strut portions 70 adjacent the free ends 74 engage or lie closely adjacent intermediate reduced diameter portion 80 of shaft 32. It will also be seen that when shaft 32 is received in body 12, the free ends 74 of strut portions 70 are generally in facing relationship to annular shoulder 82 on shaft 32. Disposed in intermediate diameter portion 58 of bore 34 is an annular stop ring 84, ring 84 being press fitted into intermediate diameter portion 58 of bore 34 and being positioned closely adjacent retaining collar 64.

In assembling the rotatable shaft assembly of the present invention, retaining collar 64, stop ring 84, packing ring 45, packings 46 and the gland assembly are first disposed in bore 34 in the manner shown in FIG. 1. Shaft 32 is next inserted through the gland and packing assembly, stop ring 84 and retaining collar 64. It will be observed that as shaft 32 passes through retaining collar 64, because fingers 68 are radially resilient, they will be forced radially outwardly toward band 66 as the first end portion 76 of shaft 32 passes through fingers 68. As shaft 32 is moved further into bore 34 of body 12, reduced diameter portion 80 of shaft 32 will come into general register with retaining collar 64 at which point fingers 68, because they are radially resilient, will spring radially inward so as to engage or at least be closely adjacent reduced diameter portion 80.

Referring now to FIG. 2, there is shown a condition in which shaft 32 has sheared at the point indicated by arrow A. Under such circumstances, and assuming that the valve is in an environment subjected to high line pressure, and further assuming that retaining collar 64 were not present, the pressure in fluid passage 14 would act against shaft 32 forcing it away from fluid passage 14 and blow it out of valve body 12. Accordingly, fluid in passage 14 would be free to escape through bore 34. However, because of the presence of retaining collar 64, shaft 32 is retained in valve body 12 with the result that no fluid leaks out of flow passage 14 because of the sealing between packings 46 and shaft 32. It can be seen by comparison of FIGS. 1 and 2 that when shaft 32 shears, the fluid pressure acts to force shaft 32 away from fluid passage 14 until the shoulder 82 engages the free ends 74 of the fingers 68 on retaining collar 64. At this point, the strut portions 70 of fingers 68 are essentially placed in compressive loading along their length. Because of this compressive loading which follows from the unique strut configuration of the fingers 68, it will be appreciated that retaining collar 64, or at least the fingers 68, can be made of relatively thin metal. Once the free ends 74 of strut portion 70 engage shoulder 62, further upward movement, i.e. out of bore 34, of shaft 32 is stopped since retaining collar 64 will be forced into engagement and stopped by annular stop member 84. In this condition, strut portions 70 will be in essentially axial compression along their length between shoulders 62 and stop member 84. So effective is the action of retaining collar 64 in preventing blowout of shaft 32 from valve body 12, that it has been found that even if a typical valve is subjected to line pressure five times in excess of the desired working capacity of the valve, the shaft is not blown out. Indeed, even under the action of extreme pressures tending to force shaft 32 out of valve body 12, the strut portions 70 do not collapse but rather tend to roll up with the effect that the shaft becomes even more firmly jammed in the valve.

As noted above, one distinct difficulty with prior art valve assemblies having blowout proof shafts is that it is difficult to remove the shaft from the valve assembly should it fail or should the valve need to be disassembled. With the rotatable shaft assembly of the present invention, removal of the shaft can be done quickly and easily with no damage to the valve assembly or to retaining collar 64. FIG. 3 shows valve body 12 with shaft 32 removed. To accomplish this, the stuffing box assembly comprised of the gland assembly and packing assembly are first removed from bore 34. A cylindrical sleeve 86 similar to bushing 44 is then slipped over shaft 32 and forced downwardly until it engages the fingers 68 on retaining collar 64. Further downward movement of sleeves 86 results in resilient, radially outward deflection of fingers 68 permitting cylindrical sleeve 86 to engage bushing 44. Since cylindrical sleeve 86 has an I.D. greater than the O.D. of shaft 32, it will be appreciated that shaft 32, once it has been disengaged from attachment to disk 20, can then be pulled upwardly out of bore 34 without any engagement of struts 70 and shoulder 82 on shaft 32. Once shaft 32 has been removed, sleeve 86 can then be removed whereupon fingers 68, because they are radially resilient, will again spring inwardly into the general position shown in FIG.

1. Reinsertion of a shaft can then be accomplished in the manner hereinabove described.

While shaft 32 has been shown as having an essentially constant diameter save for intermediate portion 80, it can be undestood that shaft 32 could be formed having essentially a first larger diameter portion terminating in a first end and a second smaller diameter portion terminating in a second end, the necessary shoulder being formed at the intersection of the two different diameter portions. It will also be recognized that shaft 32 could be formed so as to have essentially a constant diameter portion on either side of the shoulder, and that the shoulder could be formed by means of a snap ring or the like received in an annular groove intermediate the ends of the shaft. Also, although the reduced diameter portion of shaft 32 has been shown as having a frustoconical surface, it will be understood that a cylindrical surface or other configured surface can be used as well, provided that there is a shoulder formed which will engage the fingers of the retaining collar. The use of a frustoconical or similarly tapered surface such as 80 is desirable as such a shape eliminates a sharp edge which would be encountered in the case where the reduced diameter portion formed a cylindrical surface and thereby reduces the number of stress points along shaft 32.

While particular embodiments of the present invention have been shown and modified, it will be apparent to those skilled in the art that minor changes and modifications may be made therein without departing from the true scope and spirit of the invention.

What is claimed is:

1. A rotatable shaft assembly comprising:
   a body having a bore therein, said bore having a first end and a second end, said body further including an annular abutment formed intermediate said first and second ends of said bore and projecting radially inwardly into said bore;
   a shaft rotatably received in said bore, said shaft having means forming an annular, generally axially facing shoulder intermediate the ends thereof, said shoulder having at least one surface facing said second end of said bore;
   a retaining collar disposed in said bore adjacent said abutment, said retaining collar comprising an annular band and a plurality of resiliently, radially deflective fingers depending radially inwardly from said band, each of said fingers forming a strut portion terminating in a free end, said free end of said strut portion being engagable with said shoulder upon movement of said shaft toward said second end of said bore whereby said strut portion is placed in substantially compressive loading; and
   stop means disposed in said bore for stopping movement of said retaining collar toward said second end.

2. The assembly of claim 1 wherein said body comprises a valve body.

3. The assembly of claim 2 wherein said valve body comprises a butterfly valve body.

4. The assembly of claim 1 wherein said bore has a smaller first diameter portion and a larger second diameter portion, said shoulder being formed at the intersection of said smaller and larger diameter portions.

5. The assembly of claim 1 wherein said shaft has a reduced diameter portion which forms said shoulder.

6. The assembly of claim 5 wherein said shaft includes a first end portion and a second end portion having substantially the same diameter.

7. The assembly of claim 6 wherein said reduced diameter portion on said shaft defines a frustoconical surface.

8. The assembly of claim 5 wherein said free ends of said strut portions resiliently engage said reduced diameter portion of said shaft.

9. The assembly of claim 8 wherein said fingers are resiliently deflectable radially outwardly whereby said shaft can be moved toward said second end of said bore without engagement of said free ends of said strut portions and said shoulder.

* * * * *